3,544,875
CONTROL SYSTEM FOR A MACHINE TOOL

Seiichi Hara, Yokohama-shi, Giichi Kosuge, Chigasaki-shi, and Kazuji Inoue, Yokosuka-shi, Japan, assignors to Tokyo Sharyo Seizo Kabushiki Kaisha, Yokohama-shi, Japan
Filed May 16, 1967, Ser. No. 638,796
Claims priority, application Japan, May 20, 1966, 41/31,789
Int. Cl. G05b 9/02
U.S. Cl. 318—563                    10 Claims

ABSTRACT OF THE DISCLOSURE

The overload protection of a cutting tool in a machine tool is based on the assumption that the power factor of an alternating current motor for driving the machine tool represents the loading condition of the cutting tool. Both a pulse, generated at each zero of the motor current, and a square wave, with variable presettable width, generated at each zero of the supplied voltage, are supplied to an AND-gate which generates a signal for protecting the tool from damage due to overload, responsive to whether or not the current pulse falls within the width of the square wave.

DETAILED DESCRIPTION

The present invention relates to a control system for a machine tool, particularly to a cutting machine employing an alternating current motor as a driving source.

The principal object of the present invention is to control automatically a cutting machine so as to prevent its cutting tool from damage due to increasing load caused by deterioration in cutting ability of the cutting tool or the like.

Another object of the invention is to detect, digitally, the loading condition of a driving motor for a cutting machine, which varies, in accordance with cutting resistance of the cutting tool as a variation in its power factor.

A further object of the invention is to convert the thus detected power factor into a two-position output adapted for controlling the sequence cycle of the machine.

According to the present invention, these objects are carried out as follows:

The load current of an alternating current motor for driving a cutting machine is applied to a current transformer having a center tap at its secondary winding. The secondary outputs of the current transformer are applied to a pulse generator consisting of a differential amplifier and an AND-gate to generate a pulse at each zero of the outputs. The voltage across the alternating current motor is applied to a potential transformer having a center tap at its secondary winding. The secondary outputs of the potential transformer are applied to a pulse generator to generate a pulse at each zero of the outputs. This pulse triggers a monostable multivibrator, with variable presettable pulse width, to generate a square wave. This square wave and the pulse corresponding to the load current are applied to an AND-gate, whereby an ON or OFF signal is generated when the phase angle between the voltage and the current is small with respect to the width of the square wave.

Figure 1:
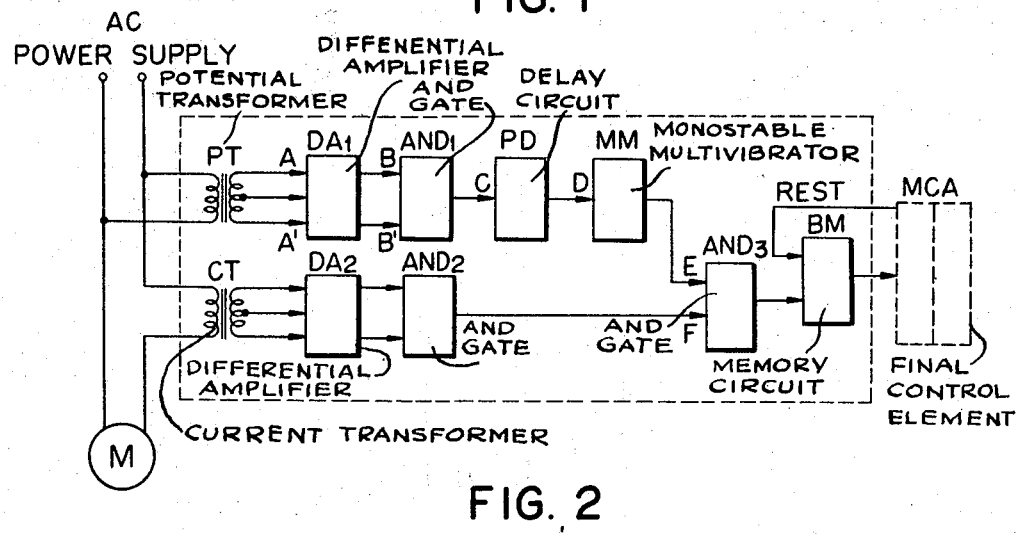
Figure 2:
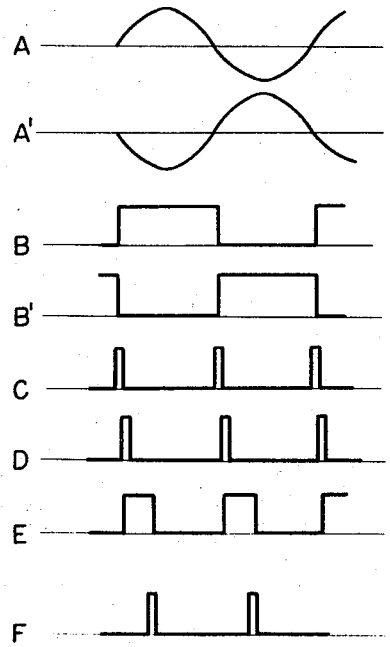

As an embodiment for the invention, a control device of step feed for a boring or drilling machine will be explained in connection with the accompanying drawing, in which FIG. 1 is a block diagram of the control device; and
FIG. 2 is a diagram showing the wave forms of voltages or currents at the parts in FIG. 1.

Referring now to FIG. 1, AC denotes an alternating current supply, M an alternating current motor for driving a cutting machine, PT a potential transformer with a center tap at its secondary winding, CT a current transformer with a center tap at its secondary winding, $DA_1$ and $DA_2$ differential amplifiers $AND_1$ and $AND_2$ AND-gates, PD a delay circuit, MM a monostable multivibrator with presettable pulse width, $AND_3$ an AND-gate, BM a memory circuit and MCA a final control element of a cutting machine.

The delay circuit PD may comprise a condenser and a resistance, in a manner well known to those skilled in the art. Such a delay circuit is illustrated, for example, in FIG. 13.14 on page 143 of "Transistor Manual," fifth edition, published by General Electric Company in 1960.

The monostable multivibrator MM is a well known electronic device, and a typical monostable multivibrator, of this type, is shown in FIG. 8.13 on page 286 of "Transistors," published by McGraw-Hill Book Company, Inc., and whose author is Milton S. Kiver.

Memory circuits, such as the memory circuit BM, are very well known in the computer art, for example, as well as in other fields. A typical memory circuit, which can be used as the element BM, is shown in MacGregor U.S. Pat. No. 3,145,332, issued Aug. 18, 1964, at 150 in FIGS. 1 and 4, and is described in some detail beginning at col. 3, line 71, and continuing through col. 4, line 16.

The above parts operate as follows:

The voltage across alternating current motor M is applied to the primary of potential transformer PT at the secondary of which two alternating signals A, A' in phase opposition to each other are applied as inputs for the differential amplifier $DA_1$. The differential amplifier $DA_1$ generates then outputs B, B' having wave forms as shown in FIG. 2. The differential amplifier $DA_1$ comes into balancing condition only when both signals A and A' pass through their zero points. The AND-gate $AND_1$, which is supplied with the outputs B, B' of the differential amplifier $DA_1$, generates a pulse C at each zero of the instantaneous voltage of the power supply.

In order to detect the phase of the load current, the current transformer CT has its primary connected in series with the load M. The output signals at the secondary of the current transformer CT are applied to the differential amplifier $DA_2$ in the same way as in detection of the phase of the voltage. The AND-gate $AND_2$, which is fed with the output signals of the differential amplifier $DA_2$, generates a pulse F at each zero of the instantaneous load current.

Since, in general, the phase angle $\theta$ between the primary current and the secondary current of the current transformer CT differs from the phase angle $\theta'$ between the primary voltage and the secondary voltage of the potential transformer PT, it is impossible to detect accurately the phase difference between the voltage and the current. For the purpose of obtaining the condition $\theta = \theta'$, the pulse C from the AND-gate $AND_1$ is supplied to the monostable multivibrator MM through the delay circuit PD. For the same purpose, it is of course possible to pass the pulse F from the AND-gate $AND_2$ through the delay circuit.

The output E of the monostable multivibrator MM, having a square wave form of a certain width, and the output F of the AND-gate $AND_2$ are supplied to the AND-gate $AND_3$. Provided that the square wave E has a width $\theta_T$, the AND-gate $AND_3$ generates an output signal when the phase difference between the voltage and the current of the motor M lies within the width $\theta_T$. The output signal of the AND-gate $AND_3$ is storaged in the memory circuit BM and then fed to the final control element MCA so as to control the sequence cycle of the cutting machine whereby a cutting tool of the machine can be prevented from damage due to overload. After completion of the above operation, at every step feed, the memory circuit BM receives a signal from the final control element MCA and is reset for the next step Thus the invention makes it possible for all sorts of machine tools to carry out protective motion, such as emergency return or variation in feeding speed, prior to damage to tools used. The control device, which is independent of either fluctuation in voltage of the power supply or the capacity of an alternating current motor, can be used in various ways.

What is claimed is:

1. Control system for overload protection of a machine tool driven by an A.C. motor, comprising, in combination, first circuit means providing a first output pulse responsive to each passage through zero of the voltage across said motor; second circuit means providing a second output pulse responsive to each passage through zero of the current through said motor; third circuit means connected to the output of one of said first and second circuit means and providing output pulses that are substantially wider third pulses; and phase comparison means connected to said third circuit means and to the other of said first and second circuit means and providing a motor control signal in accordance with whether or not an output pulse of said other circuit means occurs within the time period of the corresponding third pulse, to control the motor operation in accordance with the power factor of said motor.

2. Control system for a machine tool according to claim 1, wherein the phase of the pulse corresponding to the voltage is adjusted by means of a delay circuit.

3. Control system for a machine tool according to claim 1, wherein the phase of the pulse corresponding to the load current is adjusted by means of a delay circuit.

4. Control system for a machine tool, according to claim 1, wherein said first circuit means comprises a potential transformer having a center tap in its secondary winding and having the voltage across the motor applied to its primary winding, and a first pulse generator connected to said secondary winding; said second circuit means comprising a current transformer having a center tap in its secondary winding and having the motor current flowing through its primary winding, and a second pulse generator conected to the secondary winding of said current transformer.

5. Control system for a machine tool, according to claim 4, in which each pulse generator comprises a differential amplifier connected to the secondary winding of the respective one of said transformers and an AND gate connected to the output of said differential transformer.

6. Control system for a machine tool, according to claim 4, in which said third circuit means comprises a monostable multi-vibrator, having a presettable pulse width, connected to the output of the associated pulse generator.

7. Control system for a machine tool, according to claim 1, in which said phase comparison means comprises an AND gate having said output pulses of said other circuit means and said third pulses applied to its input; and a memory circuit connected to the output of said AND gate.

8. Control system for a machine tool, according to claim 1, in which said third circuit means is connected to the output of said first circuit means.

9. Control system for a machine tool, according to claim 1, in which said first circuit means comprises a potential transformer having a center tap in its secondary winding and having the voltage across said motor applied to its primary winding, a first differential amplifier connected to said secondary winding and a first AND gate connected to the output of said first differential transformer; said second circuit means comprising a current transformer having a center tap in its secondary winding and having the motor current flowing through its primary winding, a second differential transformer connected to the secondary winding of said current transformer and a second AND gate connected to the output of said differential transformer; said third circuit means comprising a monostable multivibrator, having a presettable width, connected to the output of said first AND gate; said phase comparison means comprising a third AND gate having one input connected to said monostable multivibrator and another input connected to said second AND gate, and a memory circuit connected to the output of said third AND gate.

10. Control system for a machine tool, according to claim 9, in which said third circuit means further includes a delay circuit connected between the output of said first AND gate and the input of said monostable multivibrator.

References Cited

UNITED STATES PATENTS

| | | | |
|---|---|---|---|
| 1,923,754 | 8/1933 | Seeley | 318—178X |
| 3,145,332 | 8/1964 | MacGregor | 318—179 |
| 3,214,666 | 10/1965 | Clerc | 318—317 |

BENJAMIN DOBECK, Primary Examiner

U.S. Cl. X.R.

318—178